United States Patent [19]

Zajicek et al.

[11] 4,256,470

[45] Mar. 17, 1981

[54] PROCESS FOR THE DESTRUCTION OF FOAM

[75] Inventors: Otmar Zajicek; Jürgen Kirschner, both of Cologne; Helmut Klapp, Koln-Pesch; Rainer Rompeltien, Cologne, all of Fed. Rep. of Germany

[73] Assignee: Wacker-Chemie GmbH, Munich, Fed. Rep. of Germany

[21] Appl. No.: 969,843

[22] Filed: Dec. 15, 1978

[30] Foreign Application Priority Data

Dec. 22, 1977 [DE] Fed. Rep. of Germany ....... 2757345

[51] Int. Cl.³ .............................................. B01D 19/02
[52] U.S. Cl. ........................................ 55/48; 55/87; 55/97; 55/523; 210/510; 252/361; 210/323.2
[58] Field of Search ............... 210/323 R, 323 T, 510, 210/80, 82, 411; 55/525, 523, 178, 87, 97, 302, 487, 36, 46, 48; 252/361

[56] References Cited

U.S. PATENT DOCUMENTS

| 2,420,115 | 5/1947 | Walker et al. | 55/178 |
|---|---|---|---|
| 3,127,255 | 3/1964 | Winslow | 55/178 |
| 3,212,234 | 10/1965 | McMinn | 55/178 |
| 3,220,166 | 11/1965 | Litsios | 55/178 |
| 3,252,270 | 5/1966 | Pall et al. | 55/523 |
| 3,371,059 | 2/1968 | Rich | 55/178 |
| 3,448,862 | 6/1969 | Kudlaty | 55/487 |
| 3,540,190 | 11/1970 | Brink, Jr. | 55/523 |
| 3,721,069 | 3/1973 | Walker | 55/487 |
| 3,853,504 | 12/1974 | Buscher et al. | 55/523 |
| 4,110,089 | 8/1978 | Muller | 55/178 |
| 4,126,560 | 11/1978 | Marcus et al. | 55/523 |

Primary Examiner—Frank W. Lutter
Assistant Examiner—Gregory N. Clements
Attorney, Agent, or Firm—Hammond & Littell, Weissenberger and Muserlian

[57] ABSTRACT

The invention relates to the destruction of foams that are produced in various industrial processes, especially in the degassing and/or removal of monomers from plastics dispersions, by the use of porous filter elements without using moving mechanical foam-destroying devices and/or without the addition of chemical foam-destroying agents.

8 Claims, 3 Drawing Figures

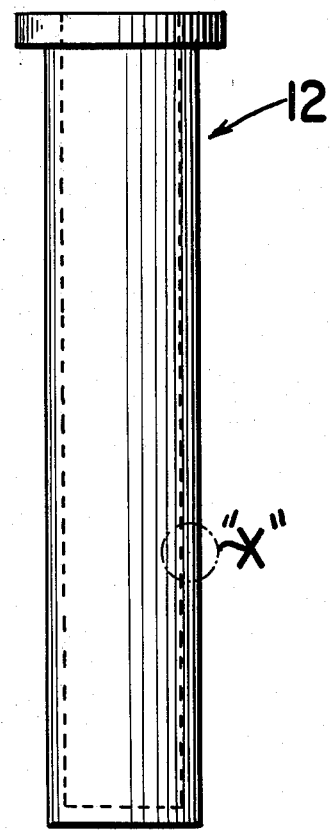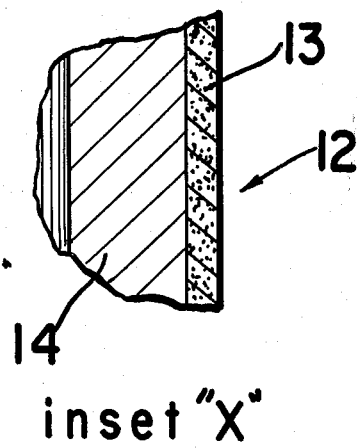
FIG. 2
FIG. 3
inset "X"

PROCESS FOR THE DESTRUCTION OF FOAM

BACKGROUND OF THE INVENTION

When removing gases and/or volatile liquids from solutions, suspensions, emulsions, dispersions and/or solid materials in large scale industrial processes, the formation of troublesome foams of considerable stability frequently occurs. Processes and devices for destroying foams are, therefore, of great industrial importance. To suppress foam formation and/or to destroy foams, it is well known to add chemical antifoaming agents and/or to use mechanical devices designed for this purpose.

Chemical foam-destroying agents have, in principal, a good action but their use contaminates the foaming medium. Generally, such large amounts of antifoaming agents are required that the product contained in the foaming medium undergoes changes in its properties due to the presence of the antifoaming agents which are often undesirable.

The majority of the known mechanical foam-destroying devices are so-called centrifugal force separators. The foam is very rapidly accelerated by a rotating device whereupon the bubbles of the foam burst and the gas is able to escape. The disadvantage of these foam-destroying devices lies in the fact that they have a stress limit above which they do not have a satisfactory action. In addition, with various solutions, suspensions, emulsions, dispersions and/or solid materials that are to be freed from gases and/or volatile liquids, and especially with toxic substances and/or substances that are sensitive to air, the installation of such centrifugal force separators or similar apparatuses in the containers, e.g., autoclaves, requires considerably effort and involves great difficulties and high costs as regards air-tightness, control, cleaning and repair.

OBJECTS OF THE INVENTION

An object of the present invention is the development of a process for destroying foam during the removal of gases and/or volatile liquids, characterized in that the gas to be drawn off is removed through porous filter elements.

A further object of the present invention is the development of a process for destroying foams without the use of moving parts and/or without the addition of chemical antifoaming agents, that enables gases and/or volatile liquids to be removed from solutions, suspensions, emulsions, dispersions and/or solid material in a shorter time than the previously known processes not employing filter elements, and provides absolute reliability against overfoaming.

A yet further object of the present invention is the development of a process for the destruction of foam produced during the removal of gases, which may be vaporized liquid, from a liquid media having a tendency to foam consisting essentially of passing the gases being removed through porous filter elements whereby foam in contact therewith is destroyed, and the liquid media portion of said destroyed foam is returned to said liquid media.

These and other objects of the present invention will become more apparent as the description thereof proceeds.

THE DRAWINGS

FIG. 2 depicts a double-layered sintered metal filter candle.

FIG. 3 depicts an enlarged detail of the double layer filter candle of FIG. 2.

DESCRIPTION OF THE INVENTION

Figure 1:
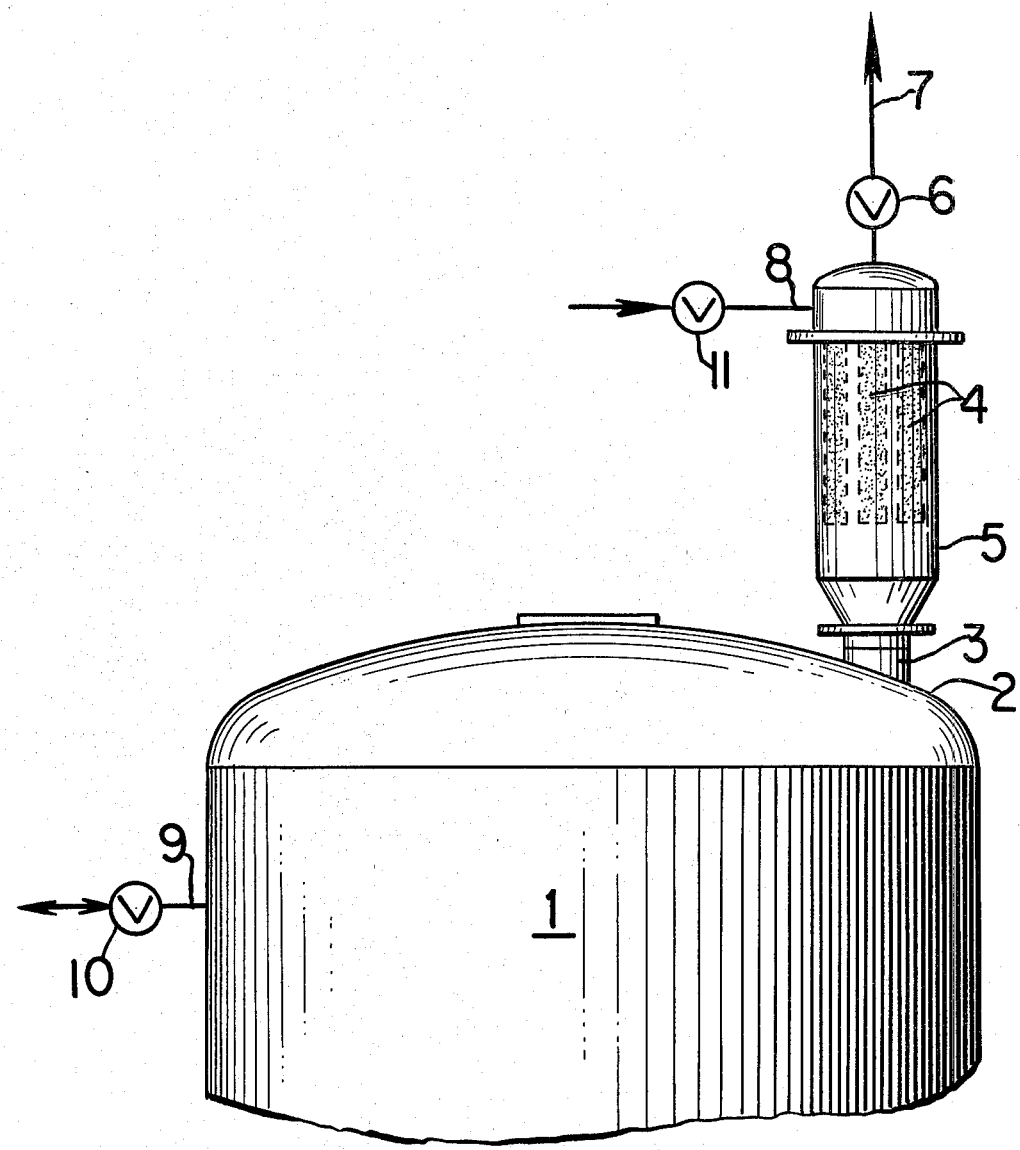
FIG. 1 depicts a schematic outline of the practice of the invention.

It has now been discovered that foam is readily destroyed when contacted with porous filter elements where the gas being driven off proceeds through the pores of the porous filter elements.

More particularly, therefore, the invention relates to a process for the destruction of foam produced during the removal of gases, which may be vaporized liquids, from a liquid media having a tendency to foam consisting essentially of passing the gases being removed through porous filter elements whereby foam in contact therewith is destroyed, and the liquid media portion of said destroyed foam is returned to said liquid media.

The porous filter elements, preferable filter candles, used according to the invention generally consist of open-celled foamed or sintered materials, especially plastics materials, for example, polyvinyl chloride, polyethylene and/or polyurethanes, sintered glass and, especially sintered ceramic material or sintered metal, for example, Monel®, nickel, Inconel®, titanium, tungsten, bronze, brass, iron, non-alloyed steels, silver, aluminum, heavy metal carbides, copper-tin bronzes, copper/nickel alloys and/or copper/nickel/tin alloys, preferably stainless steel. Wound filter candles made of regenerated cellulose, viscose, rayon fiber, cotton, glass fiber, asbestos and plastics fibers, for example, polypropylene, polyamide and polyester, are likewise suitable for the process of the invention, as also are wound filter cartridges having separate threads and/or fibrous fleece structure, filter candles made of folded filter paper that is arranged in the shape of a star about a support tube, filter candles made of sintered stainless steel web that is arranged cylindrically or folded in the shape of a star about a stainless steel support core, and also filter candles made of metallic fiber fleece.

These porous filter elements used according to the invention, preferably filter candles, may be single-layered double-layered or multilayered, and are especially preferably double-layered, as depicted in FIGS. 2 and 3. The sintered metal filter candle 12 is built up of two layers, and outer layer 13 and an inner layer 14, the layer 13 that is first in the direction of flow preferably having a smaller pore width than the following layer: the individual filter 14 layers themselves may have a pore width that decreases or increases in the direction of flow.

It has proved advantageous to dimension the filter elements to 0.5 to 40 m², preferably 1 to 15 m²; the porosity, defined as the volume of the pores (pore space) relative to the volume of material, is advantageously from 15% to 85%, preferably 25% to 50%, and the maximum pore size, defined as the diameter of the largest sphere that is just able to pass through the filter, is 1 to 500μ, preferably 5 to 100μ.

Advantageously, the filter elements used according to the invention can be easily cleaned by passing water or a short burst of steam through them in the opposite direction to the direction in which the gas/volatile liquid passes.

The process according to the invention can be applied to all industrial processes in which foams are produced, for example, in fermenting processes, such as in the processing of substances of biological origin, for example, proteins, saponines in the sugar industry, and especially in the removal of monomers (demonomerization) and/or degassing of plastics dispersions. Such degassing processes may be carried out, for example, under vacuum. In these processes, the dispersions come to the boil, and, because of the content of protective colloids and/or emulsifiers added prior to or during the polymerization, foam is produced. Furthermore, it is possible to degas such dispersions by passing inert gases through them, such as, for example, nitrogen, inorganic and organic solvent vapors, or water vapor (steam). In this case, a considerable amount of foam is likewise produced.

It is surprising that the installation of porous filter elements, such as those described above, preferably above the filling level and in front of the outlet opening of the vessel for the gases to be removed, for example, the autoclave or the depressurizing vessel, is a measure, that, as a result of the destruction of foam occurring on the filter elements, is sufficient to prevent foams from passing from the vessel into other parts of the system, for example, into pumps, compressors, pipe networks and valves, in an absolutely reliable manner.

When the solutions, suspensions, emulsions, dispersions and/or solid materials to be degassed contain polymers, and these solutions, suspensions, emulsions, dispersions and/or solid materials are in particular the reaction mixtures of polymerization processes, namely, homopolymerization, copolymerization and graft polymerization processes, monomers that have not been polymerized can be removed from the polymers and/or recovered from the solutions, suspensions, emulsions, dispersions and/or solid materials using the process according to the invention.

Suitable polymerization products, solutions, suspensions, emulsions and/or dispersions according to the invention are obtained in homopolymerization, copolymerization and graft polymerizations in solution, suspension, emulsion or dispersion, preferably in the aqueous phase, and in precipitation or pearl polymerization processes, or in the gaseous phase.

Polymerization products, solutions, suspensions, emulsions and/or dispersions that are suitable according to the invention are obtained in the polymerization, according to the above-mentioned processes, of olefinically-unsaturated compounds, especially mono-α-olefinically-unsaturated compounds, preferably vinyl esters of alkanoic acids having from 1 to 18 carbon atoms, for example, vinyl acetate and vinyl propionate; vinyl ethers, preferably vinyl ethers of lower alkanols, for example, vinyl ethyl ether; styrene; tetrafluoroethylene; acrylonitrile; acrylic acid derivatives, for example, acrylic acid, lower alkyl acrylates, such as methyl acrylate, methacrylic acid; lower alkyl methacrylates, such as methyl methacrylate; and vinyl halides, for example, vinyl chloride.

Examples of suitable plastics dispersions for the process according to the invention are polyvinyl acetate homopolymer and copolymer dispersions, polyacrylate dispersions, polystyrene/butadiene dispersions and PVC dispersions. Particularly in the case of PVC dispersions, requirements as regards environmental protection have become considerably more strict so that in this case also effective degassing processes have to be used that regularly result in problems because of the formation of foam. In the case of these PVC dispersions, whether they are produced from an emulsion polymerization, suspension polymerization or microsuspension polymerization, the process can be used with particularly good results.

When removing monomers from polymerizates, as a general rule, two to three phases of excessive foaming occur. In the case of PVC dispersions, the first strong foaming phase occurs during the so-called pressure distillation, that is to say, the residual pressure still prevailing and caused by the incompletely converted vinyl chloride, has to be relieved. A second phase of increased foam production occurs during heating of the dispersion to the degassing temperature. In the same manner, when applying a vacuum, considerable foaming may occur. The expulsion speed of gases or volatile liquids from solutions, suspensions, emulsions, dispersions and/or solid materials, can be accelerated by blowing in inert auxiliary substances, for example, nitrogen, water vapor or solvent vapor, and/or by applying a vacuum, and, at the same time, the inert auxiliary substance may act as a heat-supplying medium, but this, however, generally promotes the formation of foam.

The process according to the invention is advantageously used in the degassing of, for example, polymerizates at temperatures of from 0° to 150° C., preferably from 50° to 100° C., at an original pressure of from 0.1 to 13 bar absolute, preferably from 0.3 to 5 bar absolute. The degassing process is, in particular, so effected that the reaction mixture is first of all depressurized. Thereafter degassing is carried out for, as a general rule, 20 to 90 minutes, preferably 30 to 75 minutes, if desired, by applying a vacuum and/or by passing through an inert auxiliary substance, for example, water vapor, in specific flow rate amounts of from 0.1 to 10 t m$^{-2}$h$^{-1}$, preferably from 0.5 to 2 t m$^{-2}$h$^{-1}$. When using the process according to the invention for a degassing process, the gas is removed in a controlled manner so that the difference in pressure through the filter does not, generally speaking, exceed 25% of the original pressure.

With reference to the FIG. 1 of the drawing, the process will be discussed in detail. The degassing process is preferably carried out directly in the customary reaction apparatus, preferably an autoclave, or in the depressurizing vessel 1 in which there are arranged in the upper part 2, preferably in the top lying above the filling level, a gas outlet opening 3. Connected to the gas outlet opening 3 is a housing 5 containing the porous filter 4, preferably filter candles 12.

After passing through the filters, the gas to be removed, especially monomer, is conveyed through a tube 7 that may be closed off by means of a valve 6, generally to the suction end of compressors or pumps and, if desired, into recovery systems. Furthermore, the housing 5 preferably has another tube connection 8 that may be closed off by a valve 11 through which, should the filter elements 4 become contaminated, water, steam or special cleaning agents, for example, organic and inorganic solvents, may be passed for reversed rinsing of the filters. The vessel 1 is provided, if desired, with a motor-driven stirrer device (not shown) and, as a general rule, has one or more inlet and outlet apertures 9 for introduction of liquids, gases and/or solid materials, these apertures likewise being provided with closure devices, for example, valves 10.

The process according to the invention prevents foaming over so that pluging of the degassing and/or recovery system is avoided. This is achieved in the conventional process by throttling the amount of auxiliary substance, preferably water vapor or nitrogen, that is blown in, and by throttling the removal of gas by prolonging the expulsion of gas and thus the period of time for which the substance from which gas is to be removed, especially the polymer, remains under stress, particularly thermal stress.

Special advantages over the previous procedures are offered by the process according to the invention, particularly in the removal of monomers from polymerizates and more especially in the removal of vinyl chloride monomer from PVC polymerizate dispersions. These advantages are that no chemical antifoaming agents have to be added, as a result of which no change in the properties of the substance occurs and, in addition, capital expenditure costs are lower.

Since no moving, rotating parts are necessary in the process according to the invention, there are also no sealing problems; the maintenance costs are lower, and operation is easier, especially as no manual control is required. Surprisingly, deposition of the foam and especially destruction of the foam was detected on the porous filters, but penetration of particles of solid material into the individual pores of the filter layer could not be detected, even with the use of a microscope.

The process according to the invention provides absolute certainty that no substances, apart from the gas to be removed and perhaps inert auxiliary substances, are able to pass from the degassing vessel into the remaining apparatus, described in detail above, to contaminate or plug this.

The following examples illustrate the present invention without limiting it. All details of pressure given in the following text are absolute values and all details of quantity refer to the weight, unless otherwise specified.

EXAMPLE 1

In a 30 m$^3$ vessel, 15 m$^3$ of a dispersion containing 28% by weight of a suspension-PVC polymerizate were relieved of the residual polymerization pressure via a filter mounted in the lid. The filter is provided with filter candles made of sintered stainless steel (max. pore size 20$\mu$, filter area 3 m$^2$, porosity 40%). When a residual pressure of 3 bar was reached, water vapor was introduced into the dispersion for a period of 30 minutes at a pressure of 10 bar and the dispersion was heated. Finally, by connecting up a vacuum pump, the vessel contents were depressurized to 0.5 bar, whereupon the temperature in the dispersion adjusted to 81° C. For the final degassing of the dispersion, steam was introduced for a further 10 minutes while maintaining the temperature. The loss in pressure through the filter was less than 0.1 bar. The residual content of vinyl chloride in the suspension-PVC dispersion is 95 ppm, calculated on the PVC.

Despite considerable formation of foam in the vessel, no foam passes into the pipe network beyond the filter candles.

EXAMPLE 2

Example 1 was repeated with the following modification: Filter candles made of sintered ceramic material (max. pore size 10$\mu$, filter area 6 m$^2$, porosity 30%) were installed in the filter housing.

The operation was the same as in Example 1 and the residual content of vinyl chloride in the suspension-PVC dispersion was 90 ppm, calculated on the PVC.

EXAMPLE 3

In analogy to Example 1, 11 m$^3$ of a dispersion having a content of 37% by weight of vinyl chloride/vinyl acetate copolymer, with a 40% proportion of vinyl acetate, were depressurized in a 20 m$^3$ vessel via sintered nickel filter candles (filter area 1 m$^2$, max pore size 30$\mu$, porosity 35%). Subsequently, water vapor was blown in to the dispersion at a pressure of 10 bar for 25 minutes and, at the same time, by applying a vacuum, pressure in the vessel was reduced to 0.5 bar. A temperature of 81° C. in the dispersion was again reached. By further admission of water vapor at 10 bar for a period of 50 minutes, this temperature was maintained. The loss in pressure through the filter was less than 0.1 bar.

The polymer dispersion contains 180 ppm of monomers, calculated on the copolymer, after the de-monomerization.

COMPARISON EXAMPLE

A 30 m$^3$ vessel containing 15 m$^3$ of a dispersion containing 28% by weight of a suspension-PVC polymerizate was relieved of the residual monomer pressure via a 13.5 m$^3$ distillation separator connected to the vessel, comparably to the filter housing as described in Example 1.

Thereafter, in analogy to Example 1, water vapor was passed at a pressure of 10 bar for 30 minutes through the vessel, whereupon the dispersion was heated to 81° C. The pressure in the vessel was reduced to 0.5 bar by applying a vacuum. As a result of further admission of steam for a period of 10 minutes, this temperature was maintained. The residual content of vinyl chloride in the PVC-dispersion in the vessel is 95 ppm, calculated on the PVC.

3 m$^3$ of the dispersion having a content of 2,000 ppm of vinyl chloride, calculated on the PVC, passed into the distillation separator and had to be subjected to a further demonomerization process in a second degassing process with further thermal stressing of the polymer.

The preceding specific embodiments are illustrative of the practice of the invention. It is to be understood, however, that other expedients known to those skilled in the art of disclosed herein may be employed without departing from the spirit of the invention or the scope of the appended claims.

We claim:

1. A process for the destruction of foam produced during the removal of residual monomers from an aqueous polymerizate dispersion having a tendency to foam consisting essentially of passing the gases being removed containing residual monomers through porous filter elements constructed of sintered materials and having a dimension of from 0.5 to 40 m$^2$, a porosity of from 15% to 85% and a maximum pore size of from 1 to 500$\mu$, at such a rate that the difference in pressure through the filter elements does not exceed 25% of the original pressure, whereby foam in contact with said filter elements is destroyed, and the liquid portion of said destroyed foam is returned to said aqueous polymerizate dispersion.

2. The process of claim 1 wherein said porous filter elements have a porosity of from 25% to 50% and a maximum pore size of from 5 to 100$\mu$.

3. The process of claim 1 wherein said porous filter elements have at least two layers where the first layer in the direction of flow has a smaller pore size than the following layers.

4. The process of claim 3 wherein said porous filter elements having at least two layers are filter candles.

5. The process of claims 1 or 3 wherein said porous filter elements are constructed of sintered stainless steel.

6. The process of claims 1 or 3 wherein said polymerizate dispersion is treated with water vapor.

7. The process of claims 1 or 3 wherein said aqueous polymerizate dispersion is an aqueous polyvinyl chloride dispersion and said residual monomer gases are monomeric vinyl chloride.

8. A process for the destruction of foam produced during the removal of gases from an aqueous vinyl chloride polymer dispersion containing residual monomeric vinyl chloride prepared by emulsion, suspension or microsuspension polymerization conditions, consisting essentially of degassing said dispersion at temperatures of from 50° to 100° C. at a pressure of from 5 bar absolute to 0.3 bar absolute, passing the gases being removed through porous filter elements constructed of sintered materials and having a dimension of from 1 to 15 $m^2$, a porosity of from 25% to 50% and a maximum pore size of from 5 to 100$\mu$, in such a controlled manner that the difference in pressure through the filter elements does not exceed 25% of the original pressure, whereby foam in contact with said filter elements is destroyed and the liquid portion of said destroyed foam is returned to said aqueous vinyl chloride polymer dispersion.

* * * * *